Patented May 21, 1940

2,201,698

UNITED STATES PATENT OFFICE 2,201,698

LUMINESCENT MATERIAL AND METHOD OF PREPARATION THEREOF

Alfred H. McKeag, Middlesex, England, assignor to General Electric Company, a corporation of New York No Drawing. Application March 6, 1939, Serial No. 260,149. In Great Britain March 16, 1938

1 Claim. (Cl. 250—81)

The present invention relates to luminescent materials and their preparation generally, and more particularly to an improvement or modification in the preparation of a luminescent material of the type described and claimed in copending application Serial No. 201,810, filed April 13, 1938, by the applicant herein and John F. Randall and assigned to the assignee of the present invention.

The luminescent material disclosed in the said copending application contains as essential elements cadmium, manganese, chlorine, phosphorous and oxygen; has a crystal structure in which the unit cell is hexagonal with axes substantially $a_0 = 9.7$ A. U. and $c_0 = 6.4$ A. U.; and emits under excitation by radiation of wave-length 2536 A. U. luminescent light whose color is "warm," i. e., it departs from white in the direction of yellow or red and not in the direction of blue or green. This material may also be described as a cadmium chloro-phosphate with part of the cadmium replaced by manganese and corresponding substantially to the formula $(Cd, Mn)_5(PO_4)_3Cl$.

In the method of manufacture disclosed in the copending application, the presence of a chloride in the starting materials is an essential element. However, no preference is indicated therein for any one chloride over another, and in one example cadmium chloride was employed while in another example manganese chloride was employed.

I have now found, in accordance with the present invention, that certain advantages are obtained by using magnesium chloride as a starting material. A particular advantage is that the texture of the resulting material is improved so that it becomes easier to make a thin and uniform layer of it. The material may be prepared by heating together a cadmium salt, a manganese (manganous) salt, magnesium chloride, and an orthophosphate (or orthophosphoric acid or phosphorous pentoxide). There need not necessarily be four components; for example, the cadmium salt or the manganese salt may be an orthophosphate.

In one method of preparing the material, a precipitate may be formed by first dissolving 480 gm. of cadmium sulphate in 1500 ml. of boiling distilled water, and dissolving 160 grm. of di-ammonium hydrogen orthophosphate in 1000 ml. of boiling distilled water. Then 10 ml. of the second solution is added to the whole of the first and the precipitate thus formed is filtered off and discarded. The remainder of the second solution is added to the filtrate; the precipitate is filtered off, washed well with hot distilled water, and dried at 180° C. for three hours. This precipitate, which is some kind of cadmium phosphate, will be referred to hereinafter as precipitate A.

Another precipitate may then be formed by dissolving 370 gms. of manganous sulphate in 1500 ml. of boiling distilled water, and 160 gm. of di-ammonium hydrogen phosphate in 1000 ml. of boiling distilled water. The solutions are mixed and the precipitate thus formed is washed and dried at 180° C. This will be referred to as precipitate B.

After preparation of the precipitates, 100 parts by weight of precipitate A is mixed with 5 parts by weight of precipitate B, and with 10 parts of solid magnesium chloride. These components are mixed by dry grinding and shaking; the mixture is heated for one hour at 850° C. or, still better, for three hours at 800° C.; washed six times with water by decantation; and finally dried at 180° C.

What I claim as new and desire to secure by Letters Patent of the United States is:

The method of preparing a luminescent cadmium chlorophosphate containing manganese which comprises heating a mixture of components including a cadmium salt, a manganese salt, magnesium chloride and a compound of phosphorous and oxygen.

ALFRED H. McKEAG.